United States Patent
Boone et al.

(10) Patent No.: US 8,182,640 B1
(45) Date of Patent: May 22, 2012

(54) PROCESS FOR BONDING COMPONENTS TO A SURFACE

(75) Inventors: Richard Boone, Wichita, KS (US); Ronald D. Weddle, Wichita, KS (US)

(73) Assignee: Textron Innovations, Inc., Providence, RI (US)

( * ) Notice: Subject to any disclaimer, the term of this patent is extended or adjusted under 35 U.S.C. 154(b) by 0 days.

(21) Appl. No.: 12/779,706

(22) Filed: May 13, 2010

(51) Int. Cl.
   *B29C 65/00* (2006.01)
(52) U.S. Cl. ........ 156/285; 156/287; 264/511; 264/512; 264/516
(58) Field of Classification Search .................. 156/285, 156/287, 286; 264/520, 511, 512, 516
   See application file for complete search history.

(56) References Cited

U.S. PATENT DOCUMENTS

| | | | |
|---|---|---|---|
| 5,123,985 A | 6/1992 | Evans et al. | |
| 5,368,807 A * | 11/1994 | Lindsay | ......................... 264/510 |
| 5,604,010 A | 2/1997 | Hartz et al. | |
| 5,707,576 A | 1/1998 | Asher | |
| 6,458,309 B1 | 10/2002 | Allen et al. | |
| 6,589,472 B1 | 7/2003 | Benson et al. | |
| 6,632,502 B1 | 10/2003 | Allen et al. | |
| 2003/0168555 A1 | 9/2003 | Livi et al. | |
| 2004/0115299 A1 | 6/2004 | Potter et al. | |
| 2005/0183818 A1 | 8/2005 | Zenkner et al. | |
| 2006/0006599 A1 | 1/2006 | Shahidi et al. | |
| 2006/0049552 A1 | 3/2006 | Fish | |
| 2008/0083494 A1 * | 4/2008 | Sander et al. | .................. 156/285 |

OTHER PUBLICATIONS

Office Action issued in Related U.S. Appl. No. 12/829,234 dated Jan. 3, 2011, 10 pages.
Response to Office Action issued in Related U.S. Appl. No. 12/829,234 dated Mar. 18, 2011, 10 pages.
Office Action issued in Related U.S. Appl. No. 12/829,234 dated Mar. 31, 2011, 13 pages.

* cited by examiner

*Primary Examiner* — Christopher Schatz
(74) *Attorney, Agent, or Firm* — Lathrop & Gage LLP (57) ABSTRACT

A process for bonding aircraft components with a surface, such as an aircraft skin, includes positioning the skin on a tool surface and placing a floorless component on the skin, with bonding agent therebetween. A vacuum bag is placed within the floorless component via a vent in the component, and sealed with opposing inner, lower walls of the component, creating a sealed surface over the skin within the component. Additional vacuum bags seal between lower, exterior legs of the floorless component and either (a) the tool surface (enclosing the skin) or (b) lower walls of adjacent aircraft components. Lower, opposing sides of the adjacent component are also bagged, and loose bag ends are sealed to the tool surface, such that the skin and all feet of the aircraft components are enclosed in vacuum bagging material. The bagged assembly is autoclave cured to bond the aircraft components with the skin.

17 Claims, 5 Drawing Sheets

PROCESS FOR BONDING COMPONENTS TO A SURFACE

CROSS-REFERENCE TO RELATED APPLICATIONS

This application is related to commonly-owned and co-pending U.S. patent application Ser. Nos. 12/779,762, filed May 13, 2010 and entitled "Process for Bonding a Vented Hollow Component", and 12/779,744, filed May 13, 2010 and entitled "Process for Fabricating Aircraft Parts Using an Integrated Form." The disclosures of both related applications are incorporated herein by reference.

FIELD

This invention relates to the fabrication of advanced composite aerostructure articles.

BACKGROUND

Demand for strong, lightweight aircraft has led to widespread fabrication of aircraft parts from composite materials. Composite structures typically include inner and outer composite skins, with a core (e.g., a honeycomb core material) or stiffening member therebetween. These structures are commonly bonded via multiple curings in an autoclave. For example, the inner and outer skins may be separately pre-cured in an autoclave, then assembled with adhesive, a honeycomb aluminum or non-metallic core and uncured closure plies into a sandwich panel. The sandwich panel is cured once to cure the closure plies, and then vacuum bagged to a composite bond jig and again cured in an autoclave.

Co-curing methods have been introduced in an attempt to reduce the steps, man hours and expense involved in the above process. In co-curing, composite skins laid-up with adhesive and a honeycomb core are cured in a single cycle in the autoclave. However, strength is lost in co-curing due to dimpling of the composite plies inward, with nothing but the cell walls to compact the composite skins. Additional plies may be added, but they add weight and cost to the finished part. Additional problems inherent to honeycomb core elements are described in U.S. Pat. No. 5,604,010 to Hartz et al., and U.S. Pat. Nos. 6,632,502 and 6,458,309, both issued to Allen et al.

The above-mentioned Allen patents discuss use of an internal air bag to counterbalance autoclave pressure during a single stage curing method. An internal air bag is placed inside a hollow, open-ended, stiffened graphite fabric mandrel that becomes an integral part of a finished aerostructure article. The lay-up (i.e., mandrel, bag, uncured composite layers and plies) is cured in an autoclave. Similarly, U.S. Patent Application Publication No. 2006/0006599 by Shahidi et al. describes a device that fits to a mold tool where an inflatable body with a pressurizable seal exits from the mold tool. When the body is inflated, the device prevents distortion and excess inflation of the pressurizable seal so that vacuum conditions can be applied there around.

As an alternative to inflatable mandrels, removable, rigid mandrels may be inserted within a prepreg lay up prior to autoclaving. The mandrels support the layup under autoclave pressures, and are removed from the final, cured product. For example, U.S. Pat. No. 6,589,472, issued to Benson et al., describes a combination tool/vacuum bag for compressing inner surfaces of composite parts. Composite parts, joints and webs are laid up around the tool/vacuum bag, and a separate, external vacuum bag is sealed to the assembly. Under vacuum pressure, the combination tool/vacuum bag expands outward to compress inner surfaces of the composite parts. After autoclaving, the assembly is reheated to soften and collapse the combination tool/vacuum bag, so that it can be removed.

Other techniques used in vacuum-bagging/bonding processes include placement of cushioning material between a layup and a vacuum bag, and using a vacuum bag, sealed to an edge of a component, in resin transfer molding. For example, U.S. Patent Application Publication No. 2005/0183818 by Zenker et al. suggests placement of an elastomeric caul beneath vacuum bagging material that is taped to a lay-up mandrel. The caul is stretched as negative pressure is applied, to draw the caul tightly against a composite component. Placing the caul between the component and the bagging material reduces wrinkling and deformation of the composite component by the bagging material. U.S. Patent Application Publication No. 2006/0049552 by Fish et al. describes vacuum assisted resin transfer molding for making a bond line between components. A vacuum bag is sealed against the edges of a component being bonded, and a vacuum is applied to draw injected resin through a flow path between the components.

SUMMARY

The processes disclosed herein relate to bonding one or more aircraft components with a surface to be bonded. The surface to be bonded is generally an aircraft skin; however, the disclosed processes may be extended to bonding preformed components with other surfaces.

In an embodiment, a process for bonding aircraft components to a surface includes positioning a surface to be bonded on a tool surface and applying a bonding agent at intended contact points between the surface to be bonded and a plurality of preformed components. The preformed components are placed on the surface to be bonded, with the bonding agent therebetween, and vacuum bagging material is arranged about each foot of the preformed components. The vacuum bagging material is sealed to lower walls of the preformed components, to enclose the feet. Separate vacuum bags are arranged with and seal to left and right sides of the walls, and opposing sides of the same vacuum bag are sealed to facing sides of adjacent components. Loose ends of outermost vacuum bags are sealed to the tool surface, to enclose the surface to be bonded. A vacuum is applied within the bagging material to compress the component feet with the surface to be bonded; and the bagged assembly is cured to bond the components with the surface to be bonded In an embodiment, a surface to be bonded is positioned on a tool surface and a bonding agent applied at one or more intended contact points between the surface to be bonded and a floorless aircraft component. The floorless component is placed on the surface to be bonded, with the bonding agent therebetween. The interior of the floorless component is accessed via a vent in the floorless component, and opposing ends of a first vacuum bag are sealed to lower, inner walls of the floorless components to create a sealed surface over the surface to be bonded within the component. A second vacuum bag seals between a lower right, outer wall of the floorless component and the tool surface to the right of the surface to be bonded; and a third vacuum bag seals between a lower left, outer wall of the floorless component and the tool surface to the left of the surface to be bonded. A vacuum is applied within the vacuum bags, to compress the floorless component with the surface to be bonded; and the bagged assembly is cured to bond the floorless component with the surface to be bonded.

DETAILED DESCRIPTION OF THE EMBODIMENTS

Figure 1:
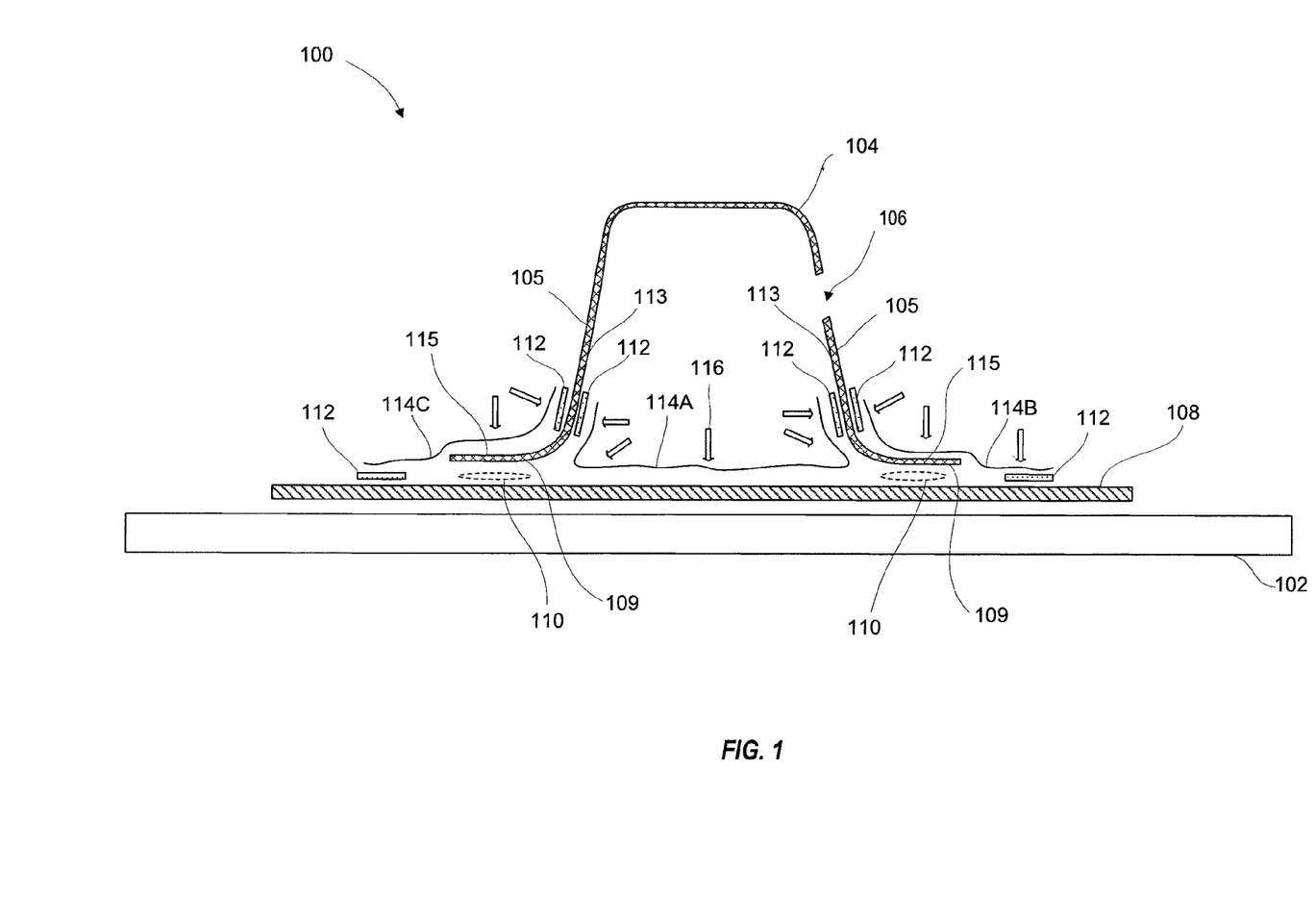
FIG. 1 is a schematic cross-sectional view of a prepreg layup including an aircraft skin and a component to be bonded therewith, according to an embodiment.

FIG. 1 is a schematic, cross-sectional view through a prepreg layup 100, on a tool surface 102. Layup 100 includes a component 104, which is for example an aircraft part such as a floorless cross-stringer. Component 104 may be a stiffened, composite structure, formed and vented according to a method described in U.S. patent application Ser. No. 12/779,744 ("Process for Fabricating Aircraft Parts Using an Integrated Form"), which is incorporated herein by reference. Component 104 is vented to outside pressure via vent 106. In one aspect, as shown, vent 106 is formed through a wall 105 of component 104. It will be appreciated that vent 106 may be formed elsewhere through component 104, to allow for introduction of pressure-equalizing air within component 104. Alternately, vent 106 may be formed as an open end of a hollow component, as is also described in the above-referenced patent application. Vent 106 may be formed during fabrication of component 104, or vent 106 may be created through pre-formed component 104 prior to bonding the component with an underlying structure.

A structure to be bonded with component 104, for example, an aircraft skin 108, is placed with tool surface 102 and a bonding agent 110 is selectively applied to skin 108 and/or a bonding surface 109 of component 104. Bonding surface 109 is for example the underside of a foot or feet of component 104 (i.e., the portion of the component resting on the aircraft skin, further identified below). It will be appreciated that bonding agent 110 is not required where an uncured prepreg skin 108 includes epoxy resin that may itself serve as a bonding agent/adhesive to secure component 104 with skin 108. For example, skin 108 may be a prepreg skin having epoxy resin with additional thickeners that fills gaps between skin 108 and component 104. In such case, additional bonding agent 110 is not needed. The dashed lines used to depict bonding agent 110 indicate its optional nature.

An adhesive 112, which may be a permanent or removable tape or glue, is applied to inner and outer walls of component 104, and vacuum bagging 114 is secured to the walls with adhesive 112. Within floorless component 104, vacuum bag 114A is secured with adhesive 112 to opposing inner walls 113, proximate component feet 115, to create a pressurizable seal over the portion of skin 108 within component 104. Vacuum bag 114B and vacuum bag 114C are respectively sealed with adhesive 112 to opposing outer walls 105 of component 104, and to opposing sides of tool surface 102 to enclose skin 108. Skin 108 is thus completely covered, either by bonding surfaces of overlying component 104, or by vacuum bagging 114 within and outside of component 104.

In typical bonding of aerospace structures, the total assembly is covered with release film, breather material and sealing material, making the bonding process difficult to automate. Large structural details are conventionally bonded in a secondary process, and not during the primary cure. By terminating vacuum bags at the lower edges of components (such as component 104), conventional bagging materials including pre-made and standardized bagging assemblies may be used. Furthermore, multiple components and hollow structures (e.g., component 104), may be assembled with a skin, bagged and bonded during the primary cure.

In conventional autoclave curing, completely bagged parts are placed in the autoclave under a vacuum. The autoclave is then closed and allowed to pressurize. At a predetermined pressure (e.g., in excess of 15 psi), the vacuum connection is opened to outside air pressure (normal atmospheric pressure outside the autoclave). As long as the autoclave pressure is higher than the outside air pressure, gas expelled from the lamination during cure will exit. As long as the vacuum bag remains intact, autoclave pressure is transferred to the bagged structures. However, in conventional autoclave curing, pressure is not transferred to the inside of a hollow structure. Inflatable mandrels may be used to provide counterpressure within such hollow structures.

Vent 106 allows equalization of pressure within and outside of component 104, such that autoclaving applies downward and outward pressure to vacuum bagging 114 within component 104, while simultaneously applying downward and inward pressure to vacuum bagging outside of component 104. See pressure arrows 116. Thus, counterpressure devices such as inflatable mandrels may be omitted. Vent 106 and vacuum bag 114A, along with vacuum bags 114B and 114C, facilitate even pressurization across the entirety of skin 108 and bonding portions of component 104, enhancing bonding between component 104 and skin 108.

Figure 2:
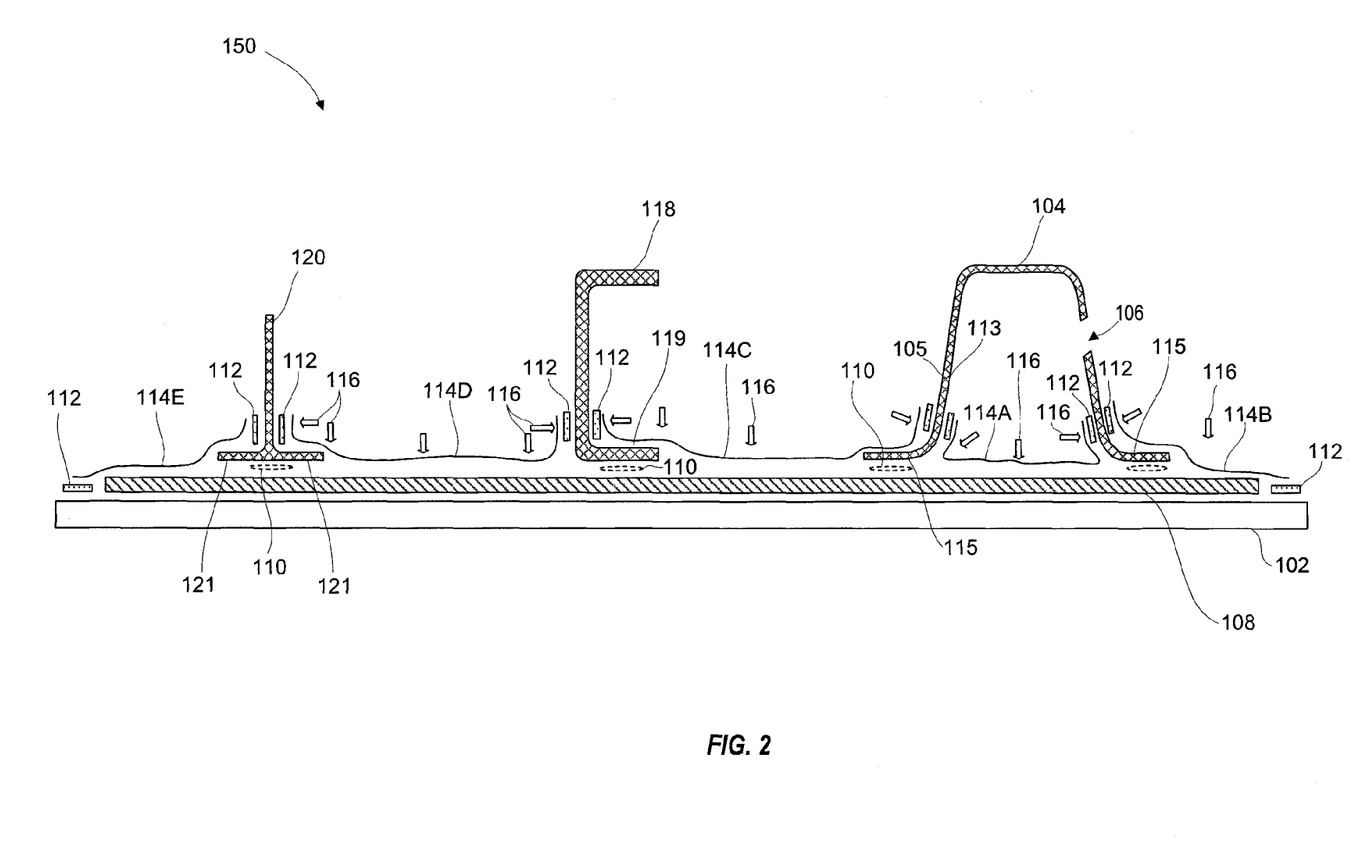
FIG. 2 is a schematic cross-sectional view of a prepreg layup including an aircraft skin and multiple components for bonding with the skin, including the component of FIG. 1.

FIG. 2 is a schematic cross-sectional view through a prepreg layup 150 including component 104 and additional components 118 and 120. Components 118 and 120 may be frames, longerons, beams or other structural members. Components 104, 118 and 120 are preliminarily bonded with skin 108 via the epoxy resin of skin 108 (if uncured) and/or with optional bonding agent 110, as described above. For example, bonding agent 110 may be used if skin 108 is pre-cured, or if additional bonding agent is desired to back up the epoxy resin and fillers of an uncured skin. Vacuum bag 114A creates a sealed surface over skin 108 within component 104, as described above. Vacuum bag 114B seals with adhesive 112 applied to right outer wall 105 (see FIG. 1) of component 104, above right foot 115. A second end of vacuum bag 114B seals with adhesive 112 applied to tool surface 102, to the right of skin 108. Vacuum bag 114C seals with adhesive 112 applied to lower left, outer wall 105 of component 104, to cover left foot 115. At a second end, vacuum bag 114C seals with adhesive 112 applied to the lower right wall of component 118, above foot 119. Vacuum bag 114D seals with adhesive 112 applied to the lower left wall of component 118, and to the lower right side of component 120, above right foot 121. Finally, vacuum bag 114E seals with adhesive 112 on the lower left side of component 120, above left foot 121, and with adhesive 112 on tool surface 102, left of skin 108. Thus, skin 108 is completely covered, by vacuum bagging 114 or by overlying components 104, 118, 120 and any optional bonding agent 110. Although not required for proper bonding, additional adhesive 112 may be applied to skin 108 (e.g., on skin 108 between components 104 and 118, between components 118 and 120 and/or between components 120/104 and tool surface 102) to aid in placing or managing vacuum bagging 114.

Once vacuum bagging 114 is in place, prepreg layup 150 is oven cured or autoclaved to pressurize, bond and cure components 104, 118 and 120 with skin 108. As explained above, vent 106 facilitates pressurization of feet 115 and skin 108 within component 104 (via vacuum bag 114A) to enhance bonding between component 104 and skin 108.

Terminating vacuum bagging 114 about the feet (i.e., at the lower edges) of components 104, 118 and 120, rather than completely bagging each component, allows for pre-made and/or standardized bagging assemblies. Individual bags may be used to secure multiple components during assembly, before bonding. Advantageously, large structural details and/or components that have previously required secondary bonding may be simultaneously assembled with an aircraft skin or other structure, and simultaneously bonded during the primary cure.

Figure 3:
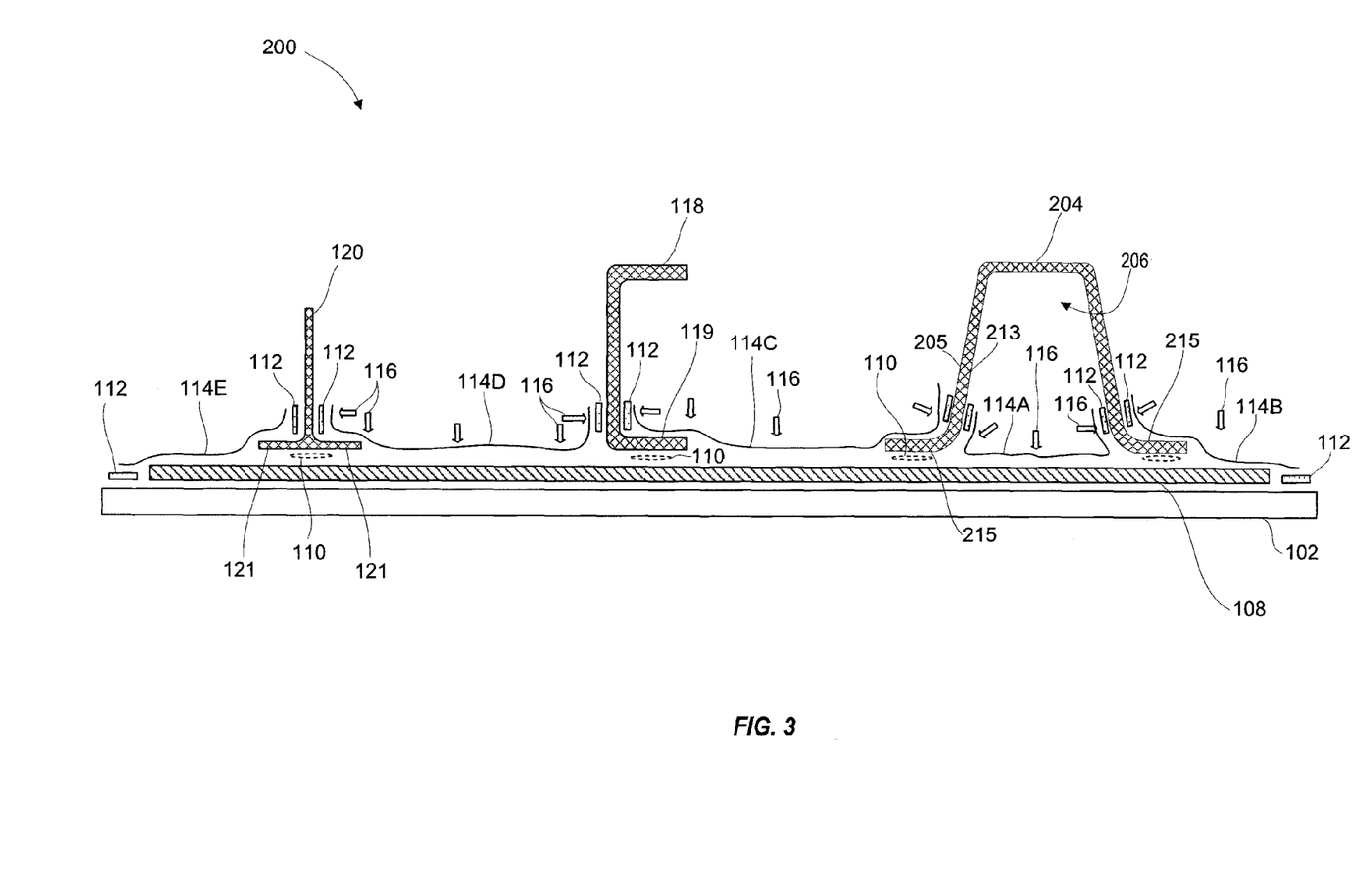
FIG. 3 is another schematic, cross-sectional view of a prepreg layup including an aircraft skin and multiple components to be bonded therewith, including a floorless, open-ended component, according to an embodiment.

FIG. 3 is a schematic cross-sectional view through a prepreg layup 200, including components 118 and 120 and a further component 204, which is a floorless hat structure similar to component 104 save that component 204 is vented via an open end 206, rather than by a vent through a side of the component. Vent/open end 206 allows access within component 204, allowing placement of vacuum bag 114A therein. Adhesive 112 is applied to lower, inner walls 213 and to lower, outer walls 205 of component 204, and vacuum bagging 214 is applied to enclose feet 215. For example, vacuum bag 114A creates a sealed surface over skin 108 within component 204; vacuum bag 114B encloses right foot 215 and skin 108 between component 204 and tool surface 102, and vacuum bag 114C encloses left foot 215 of component 204, foot 119 of component 118 and skin 108 lying therebetween. Additional components and features of FIG. 3 are described above, with respect to FIG. 2.

Figure 4:
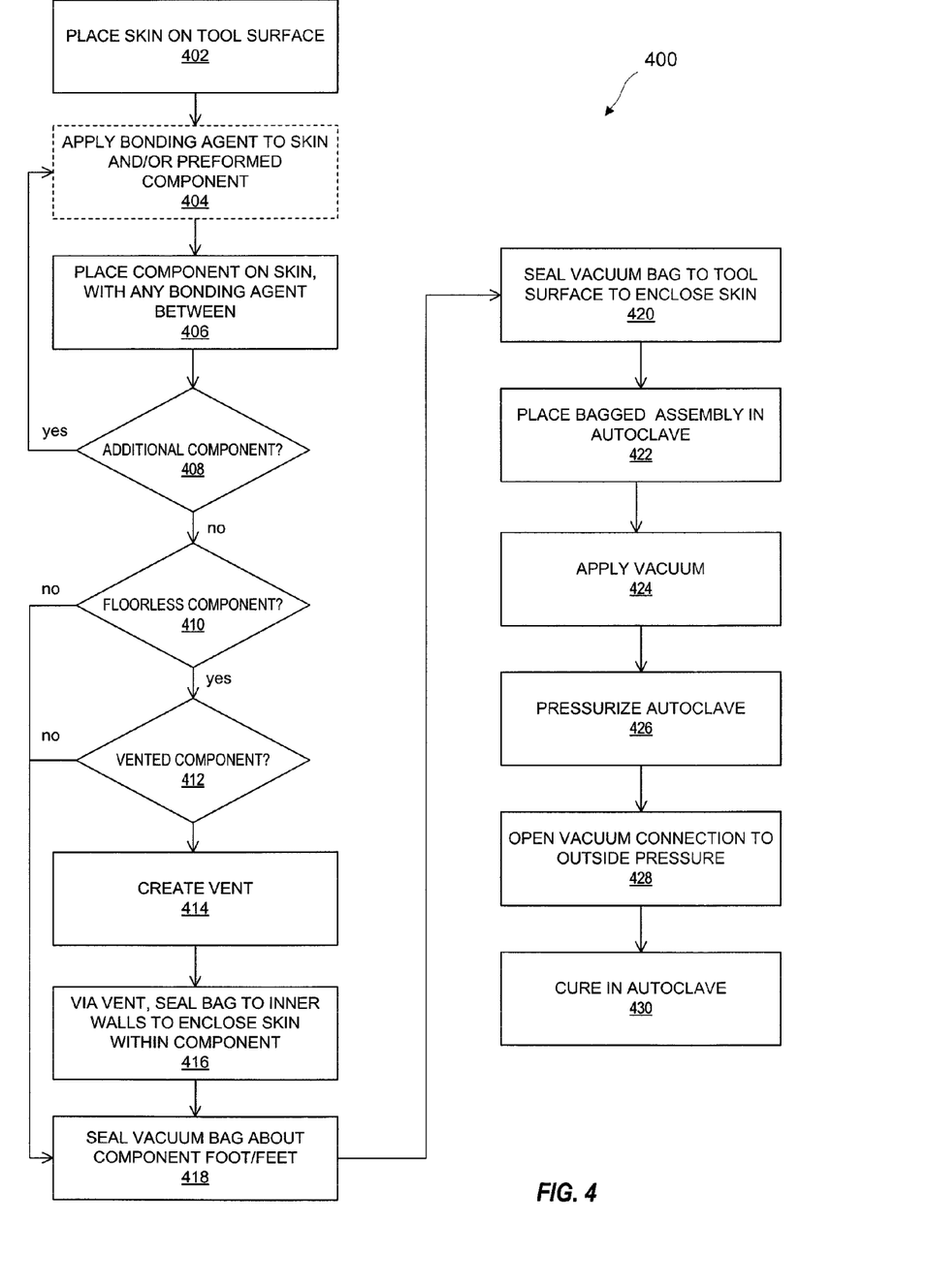
FIG. 4 is a flowchart depicting a process of bonding one or more aircraft components to a surface, according to an embodiment.

FIG. 4 illustrates a method 400 for bonding one or more preformed components to a surface, such as an aircraft skin. It will be appreciated that although method 400 includes autoclave curing, oven curing may optionally be used to bond the described preformed components to the surface (e.g., oven curing may be substituted for steps 422-430).

Method 400 commences with step 420, in which an aircraft skin is arranged on a tool surface. A bonding agent is applied to the skin and/or a preformed component at one or more intended junction point between the skin and the component, in optional step 404 (shown as a dashed box). It will be appreciated that bonding agent may be optional depending upon the resin system used with method 400. The component is placed on the skin such that any bonding agent is sandwiched between the skin and the component, in step 406.

In one example of steps 402-406, skin 108 is placed on tool surface 102. If desired, bonding agent 110 is placed at an intended contact point between skin 108 and preformed component 104. For example, if skin 108 is pre-cured, bonding agent 110 may be applied to a top surface of skin 108 at an intended contact point for component 104 and/or to an underside (i.e., bonding surface 109) of component 104. If skin 108 is uncured, epoxy resin and additional fillers of skin 108 may serve to bond skin 108 with component 104. Component 104 is then placed on skin 102 with any used bonding agent 110 therebetween.

If additional components are to be placed with skin 102 (decision 408), steps 404-406 repeat. For example, optional bonding agent 110 may be applied to components 118 and 120 and/or skin 108, and components 118 and 120 placed with skin 108, as shown in FIGS. 2 and 3. Again, epoxy resin/fillers of an uncured skin 108 may serve as an adhesive to bond components 118 and 120 therewith, and additional bonding agent 110 may be omitted. It will be appreciated that additional components need not be placed with skin 102 in a step-by-step process, but may instead be simultaneously placed with the skin, by different parties or machinery.

If a component is floorless (decision 410) and vented (decision 412), vacuum bagging material is sealed to opposing inner component walls to enclose the skin lying within the component walls, in step 416, to create a sealed surface within the component. The interior of the component is accessed through the vent. If the component is not vented, a vent is first created in step 414, so that vacuum bagging material can be applied within the component to create a sealed surface over the skin beneath. Vacuum bagging is then sealed about the foot or feet of the component(s), in step 418, and to the tool surface in step 420, such that the skin is fully enclosed, both within the component(s), according to steps 410-416, and outside of the component(s).

In one example of steps 416-420, vacuum bag 114A is sealed to lower, inner walls 113 of component 104 with adhesive 112. Vent 106 allows access within component 104. Vacuum bag 114A creates a sealed surface over skin 108 within component 104. Additional vacuum bags 114B-E are sealed about feet 115 of component 104, about foot 119 of component 118 and about feet 121 of component 120, as described above with respect to FIG. 2. Vacuum bagging 114 (e.g., free ends of vacuum bags 114B and 114E) is then sealed to tool surface 102 to enclose skin 108. If desired, for example for management of vacuum bagging material, additional adhesive 112 may be used to secure vacuum bagging 114 to skin 108 between or to the sides of components 104, 118, 120.

Once vacuum bagging is sealed about the components and to the tool surface, the bagged assembly is placed in an autoclave, in step 422. A vacuum applied within the sealed bagging, in step 424, and the autoclave is allowed to pressurize, for example to a predetermined pressure somewhere in excess of 15 psi, in step 426. Once pressurized, the vacuum connection is opened to outside air pressure, in step 428, and the assembly cures in the autoclave, in step 430.

In one example of steps 422-430, bagged layup 150 is placed in an autoclave, and a vacuum applied within vacuum bagging 114. Once the autoclave pressurizes to a predetermined pressure, the vacuum connection to the outside atmosphere (i.e., normal atmospheric pressure outside the autoclave) is opened. Since autoclave pressure is higher than outside air pressure, vacuum bagging 114 transfers autoclave pressure to skin 108 and the bagged portions of components 104, 118 and 120 (e.g., pushing on skin 108 and components 104, 118 and 120). Vent 106 in component 104 allows equalization of pressure within and outside of component 104. Vacuum bag 114A within component 104 presses downward (against skin 108) and outward (against inner walls of component 104) to facilitate curing of skin 108 and/or bonding agent 110 and encourage a strong bond between component 104 and skin 108. Vent 106 and inner vacuum bag 114A, in combination with vacuum bags 114B-114E, may prevent weakened bonding between skin 108 and components 104, 118 and 120 that might result from uneven pressurization.

Vacuum bagging about feet 119 and 121 of respective components 118 and 120 transfers autoclave pressure downward, to firmly press components 118 and 120 to skin 108, allowing skin 108 to bond with components 118 and 120 (at feet 119 and 121, and with or without bonding agent 110, as described above). See, e.g., pressure arrows 116, FIG. 2. Not all pressure arrows are labeled. Gas expelled from layup 150 during cure exits via the vacuum connection.

It will be appreciated that the steps of method 400 need not follow the exact order in which they are shown and described above. For example, a first component may be located on the skin, vented (if necessary) and bagged before a second component is located on the skin. Alternately, components may be simultaneously located and bagged, for example by different worker groups or by different machinery. In another example, adhesive (i.e., adhesive 112) may be applied proximate component feet before any components are bagged, or even before the components are placed with the skin (e.g., when the adhesive is a double-sided tape with a removable, protective liner), or adhesive and vacuum bagging material may be sequentially applied to the components. In addition, as noted above, the above-described layup may be oven-cured rather than placing and curing the layup in an autoclave.

Figure 5:
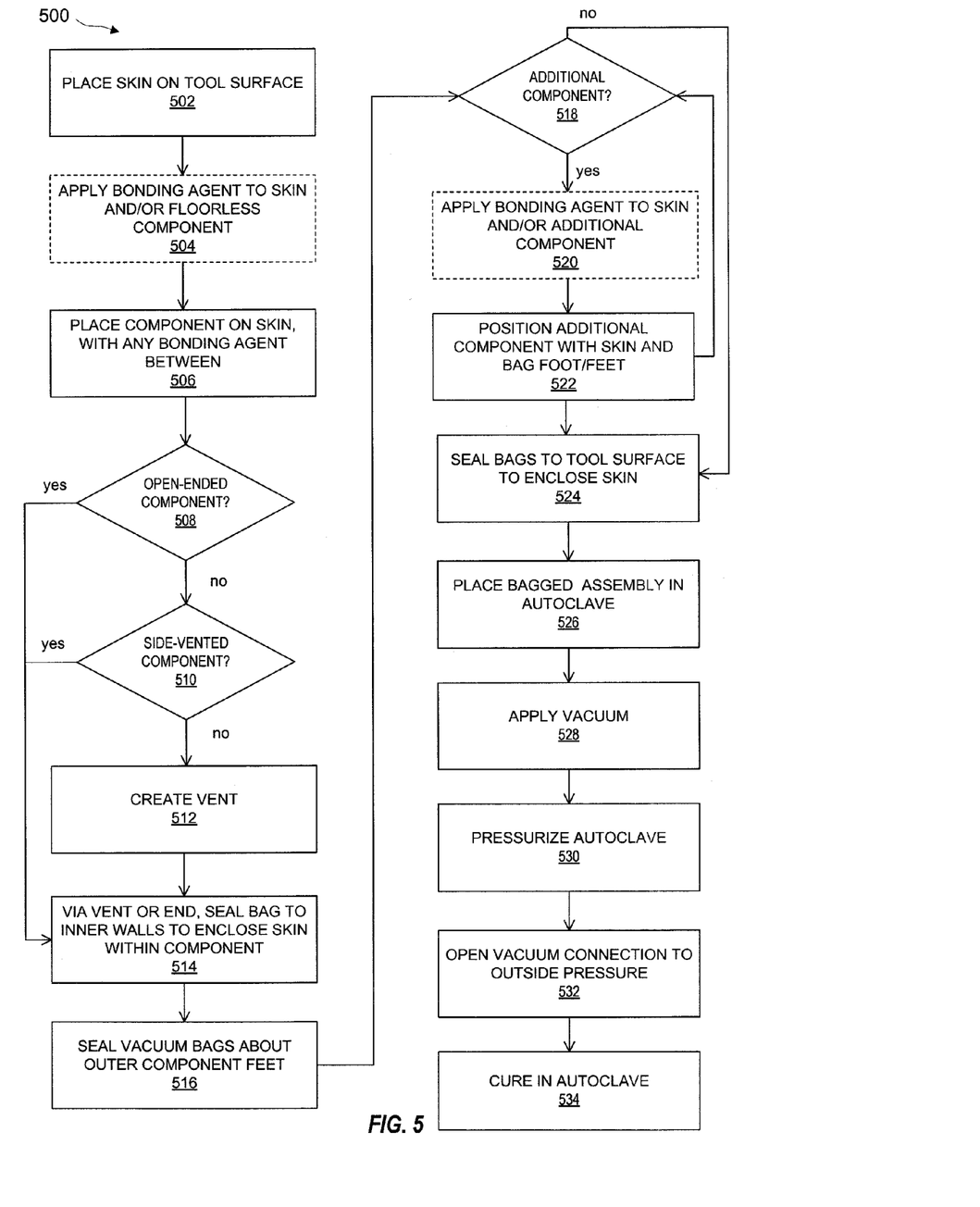
FIG. 5 is a flowchart depicting a further process for bonding one or more aircraft components to a surface, according to an embodiment.

FIG. 5 illustrates a method 500 for bonding one or more aircraft components to a surface, such as an aircraft skin. Like method 400, method 500 includes steps for autoclave curing (see steps 524-532). However, steps 502-522 may optionally be followed by oven curing if desired.

Method 500 commences with placement of the skin on a tool surface, in step 502. If necessary, bonding agent is applied to a top surface of the skin and/or a floorless component at an intended contact point between the skin and the component, in optional step 504 (indicated by a dotted box). The component is positioned on the skin with any bonding agent between the skin and the component, in step 506. If the component is open-ended (decision 508), opposing ends of a vacuum bag are sealed to opposing inner walls of the floorless component to create a sealed surface over the skin within the floorless component, in step 514. If the component is instead side-vented (decision 510), the side vent provides access to the interior of the floorless component, and a vacuum bag is sealed over the skin within the component (as described above) via the side vent. If the floorless component is neither open-ended nor side-vented, a vent is created in the component in step 512 and a vacuum bag is applied within the floorless component and over the skin within the component, via the newly-created vent.

In one example of steps 502-514, skin 108 is placed upon tool surface 102. Bonding agent 110 is applied to skin 108 and/or bonding surfaces 109 of floorless component 104, as necessary or desired. For example, floorless component 104 may be positioned with skin 108 with bonding agent 110 between component 104 and skin 108 if skin 108 is cured, or if additional bonding agent is desired to enhance bonding between an uncured skin 108 and component 104. Component 104 is side-vented (decision 510) and accordingly, internal vacuum bag 114A is sealed within component 104 via vent 106. For example, opposing ends of vacuum bag 114A seal with adhesive 112 to lower, opposing walls 113 within component 104, creating a seal over the portion of skin 108 within component 104. As noted above, if the floorless component placed in method 500 is not already vented or open-ended, a vent is created through the component in step 512, and internal vacuum bagging is placed via the new vent.

In another example of steps 502-514, skin 108 is placed upon tool surface 102 and bonding agent 110 is applied to skin 108 and/or bonding surfaces 109 of floorless component 204 as necessary or desired. Floorless component 204 is for example positioned with skin 108 with bonding agent 110 between component 204 and skin 108. If skin 108 is uncured, epoxy resin and fillers of skin 108 may serve as an adhesive layer to bond the skin with component 204, and bonding agent 110 may be omitted.

Component 204 is open-ended (decision 510). Accordingly, the interior of component 204 is accessed via open end 206, and opposing ends of vacuum bag 114A are sealed with adhesive 112 to lower, opposing walls 213 within component 204 to create a seal over the portion of skin 108 within component 204.

Following placement of the internal vacuum bag, vacuum bagging material is sealed about outer component feet, in step 516. If an additional component is to be placed (decision 518), bonding agent is optionally applied to the skin and/or the additional component (for example, if the skin is pre-cured), in step 520. The additional component is placed with the skin and its foot or feet are bagged, in step 522. Steps 520 and 522 repeat until there are no further components to be placed with the aircraft skin. Loose ends of vacuum bagging material (i.e., ends of bags that are sealed at opposing ends with outermost components placed on the aircraft skin) are sealed to the tool surface to enclose the aircraft skin, in step 524.

In one example of steps 516-522, vacuum bags 114B and 114C are sealed with adhesive 112 to lower, exterior walls 105/205 of component 104/204, covering feet 115/215. Additional components 118 and 120 are placed directly on skin 108 if skin 108 is uncured (i.e., step 520 is omitted), and their feet bagged, in step 522. Optionally, if skin 108 is pre-cured or if enhanced bonding between skin 108 and components 118 and 120 is desired, bonding agent 110 is applied to bonding surfaces of components 118 and 120 or directly to skin 108, in step 520.

In one aspect of step 522, shown in FIG. 2, vacuum bag 114C, applied at one end over left foot 115/215 of component 104/204, is spread over skin 108 between components 104/204 and 118 and sealed to component 118 just above its foot 119, via additional adhesive 112. Vacuum bag 114D is applied at a first end to a lower section of component 118, and at a second end to a lower right side of component 120, to enclose (a) the right side of foot 121 of component 120, (b) the section of skin 108 between components 118 and 120, and (c) the lower left aspect of component 118. Vacuum bag 114E is applied to the lower left side of component 120 and is spread over skin 108 and onto tool surface 102, to cover the left side of foot 121 and the portion of skin 108 between component 120 and tool surface 102.

When, per decision 518, all components have been placed, loose ends of vacuum bagging material 114 are sealed to tool surface 102, in step 524. For example, the loose end of vacuum bag 114B is sealed to tool surface 102 with adhesive 112, right of skin 108. The loose end of vacuum bag 114E is sealed to tool surface 102 to the left of skin 108. Thus, skin 108 is completely covered, either by feet 115/215, 119 and 121 of components 104/204, 118 and 120, or by vacuum bagging material 114.

Once the component/skin assembly is bagged (i.e., following step 524), the bagged assembly is placed in an autoclave, a vacuum is applied within the sealed bagging, and the autoclave is pressurized, in steps 526-530. For example, the autoclave is allowed to pressurize to a predetermined pressure somewhere in excess of 15 psi. Once pressurized, the vacuum connection is opened to outside air pressure, in step 532, and the assembly cures in the autoclave, in step 534.

In one example of steps 526-534, bagged layup 150 is placed in an autoclave, and a vacuum applied within vacuum bagging 114. Once the autoclave pressurizes to a predetermined pressure, the vacuum connection to the outside atmosphere (i.e., normal atmospheric pressure outside the autoclave) is opened. Since autoclave pressure is higher than outside air pressure, vacuum bagging 114 transfers autoclave pressure to skin 108 and the bagged portions of components 104, 118 and 120 (e.g., pushing on skin 108 and components 104, 118 and 120). Vent 106 in component 104 allows equalization of pressure within and outside of component 104. Vacuum bag 114A within component 104 presses downward (against skin 108) and outward (against inner walls of component 104) to facilitate curing of an uncured skin 108 and/or any bonding agent 110 and encourage a strong bond between component 104 and skin 108. Vent 106 and inner vacuum bag 114A, in combination with vacuum bags 114B-114E, facilitates internal pressurization of component 204 and skin 108 within component 204 to enhance bonding between component 204 and skin 108. If an uncured skin 108 is used, internal vacuum bag 114A and vent 106 further facilitate curing of the portion of skin 108 within and beneath component 104.

It will be appreciated that the steps of method 500 need not follow the exact order in which they are shown and described above. For example, all components to be placed with the skin may be preliminarily bonded before any venting/internal bagging of the floorless component. Alternately, components may be simultaneously located and bagged, for example by different worker groups or by different machinery. It will also be appreciated that the method described above may be combined with methods described in co-pending U.S. patent application Ser. Nos. 12/779,762 and 12/779,744, respectively entitled "Process for Bonding a Vented Hollow Component", and "Process for Fabricating Aircraft Parts Using an Integrated Form."

Certain changes may be made in the above systems and methods without departing from the scope hereof; thus, it is intended that all matter contained in the above description or shown in the accompanying drawings be interpreted as illustrative and not in a limiting sense. It is also to be understood that the following claims are to cover generic and specific features described herein, and all statements of the scope of the invention which, as a matter of language, might be said to fall there between.

What is claimed is:

1. Process for bonding aircraft components to a surface, comprising:
    positioning a surface to be bonded on a tool surface;
    applying a bonding agent at intended contact points between the surface to be bonded and a plurality of preformed components;
    placing the preformed components on the surface to be bonded, with the bonding agent therebetween;
    arranging vacuum bagging material about each foot of the preformed components;
    sealing the vacuum bagging material to lower walls of the preformed components, to enclose the feet; wherein separate vacuum bags are arranged with and sealed to left and right sides of the walls, and wherein opposing sides of the same vacuum bag are sealed to facing sides of adjacent components;
    sealing loose ends of outermost vacuum bags to the tool surface, to enclose the surface to be bonded;
    applying a vacuum within the bagging material, to compress the component feet with the surface to be bonded; and
    curing the bagged components with the surface to be bonded, to bond the components with the surface to be bonded;
    wherein upper portions of the preformed components remain free of bagging material during curing.

2. Process of claim 1, wherein curing comprises autoclaving or oven curing the bagged components and surface to be bonded.

3. Process of claim 1, at least one of the preformed components comprising a floorless component, and further comprising the steps of:
    accessing the interior of the floorless component via a vent through the floorless component; and
    sealing opposing ends of an inner vacuum bag between lower, inner walls of the floorless component to create a sealed surface over a portion of the surface to be bonded within the component.

4. Process of claim 3, further comprising the step of creating the vent through a wall of the floorless component.

5. Process of claim 3, the step of accessing through the vent comprising accessing the interior of the floorless component via an open end of the floorless component.

6. Process of claim 1, the steps of sealing the vacuum bagging material with the preformed components and with the tool surface comprising using an adhesive selected from the group of a double-sided tape, a single-sided tape, a foam tape and glue.

7. Process of claim 1, the preformed components selected from the group of cross stringers, longitudinal stringers, frames, longerons, beams and other structural members.

8. Process of claim 3, curing comprising curing in an autoclave; and wherein the vent and the inner vacuum bag facilitate transfer of autoclave pressure to the surface to be bonded within the component, to enhance bonding of the component with the surface to be bonded.

9. Process of claim 1, the surface to be bonded comprising an aircraft skin.

10. Process for bonding a floorless aircraft component to a surface to be bonded, comprising:
    positioning a surface to be bonded on a tool surface;
    applying a bonding agent at one or more intended contact points between the surface to be bonded and a floorless aircraft component;
    placing the floorless component on the surface to be bonded, with the bonding agent between the surface to be bonded and the floorless component;
    accessing the interior of the floorless component via a vent in the floorless component;
    adhering opposing ends of a first vacuum bag to lower, inner walls of the floorless component to create a sealed surface over the surface to be bonded within the component;
    sealing a second vacuum bag between a lower right, outer wall of the floorless component and the tool surface to the right of the surface to be bonded;
    sealing a third vacuum bag between a lower left, outer wall of the floorless component and the tool surface to the left of the surface to be bonded;
    applying a vacuum within the vacuum bags, to compress the floorless component with the surface to be bonded; and
    curing the bagged floorless component and surface to be bonded, to bond the floorless component with the surface to be bonded;
    wherein the top of the floorless component remains free of bagging material during curing.

11. Process of claim 10, the surface to be bonded comprising an aircraft skin.

12. Process of claim 10, further comprising the step of creating the vent through a wall of the floorless component.

13. Process of claim 10, the step of accessing through the vent comprising accessing the interior of the floorless component via an open end of the floorless component.

14. Process of claim 10, the steps of sealing the vacuum bagging material with the floorless component and with the tool surface comprising using an adhesive selected from the group of a double-sided tape, a single-sided tape, a foam tape and glue.

15. Process of claim 10, the floorless components selected from a cross stringer and a longitudinal stringer.

16. Process of claim 10, curing comprising autoclave curing or oven curing.

17. Process of claim 11, curing comprising autoclave curing; and wherein the vent and the inner vacuum bag facilitate transfer of autoclave pressure to the skin within the component, to enhance bonding of the component with the skin.

* * * * *